Patented Feb. 2, 1937

2,069,477

UNITED STATES PATENT OFFICE 2,069,477

CHEWING GUM

George James Manson, Hawkesbury, Ontario, Canada

No Drawing. Application September 28, 1934, Serial No. 746,012

7 Claims. (Cl. 99—135)

This invention relates to improvements in chewing gum and to bases for manufacturing the same and is a continuation in part of my application Serial No. 653,923 filed January 27, 1933.

Chicle, the standard chewing gum base, is obtained by coagulating the milk or latex of the *Achras sapota* tree. This tree grows in Central America and the largest quantity of latex gum or chicle is produced in the Southern States of Mexico, particularly Yucatan. The *Achras sapota* trees are tapped every five to eight years and yield 25 to 40 pounds of gum latex per tapping.

The milky juice is heated in an open vessel over an open fire and the moisture is evaporated until the milk has coagulated (40 to 50% moisture) into a fairly compact mass. It is then wrapped in jute bags for export.

It has been recently discovered that the Euphorbia bush in South Africa gives a milk or latex which is very similar to the latex from the *Achras sapota*. A latex called "Jelutong" is found in British Malaya and the Dutch West Indies. Jelutong, when used alone, does not make a satisfactory chewing gum. It is used to dilute chicle.

Various other substitutes for chicle have been tried, such as gutta sica, gutta kay, etc., but while they will blend with chicle they will not make a satisfactory product if used alone. In addition to the above mentioned inferior guttas many waxes, balsams and resins, both natural and synthetic have been tried as substitutes for chicle, but without success. A great many of these, however, can be used as adulterants for chicle.

Polymerized vinyl acetate, a synthetic resin, has been tried as a substitute for chicle, without success. This resin has many advantages over chicle, but has the unfortunate characteristic of sticking to the teeth when used as a chewing gum base.

I have found that a blend of polymerized vinyl acetate, sulphur and a plasticizer makes an ideal base for chewing gum. While this base will blend with chicle, it does not require chicle to make a satisfactory chewing gum.

Below are given the proportions of polymerized vinyl acetate, sulphur and plasticizer which, when properly blended, make an excellent base for a chewing gum which is to carry a fairly high percentage of medicinal oils:

| | Parts by weight |
|---|---|
| Polymerized vinyl acetate | 100 |
| Sulphur | 83 |
| Plasticizer | 18 |

The materials may be blended in a mixer heated by oil and agitated by one or more propellers running at 1500 to 2000 R. P. M. It is very necessary that the mass be thoroughly agitated while blending.

The polymerized vinyl acetate and sulphur are ground together to about an 80 mesh and when the oil in the jacket is at 170° C. about 40 lbs. of the ground polymerized vinyl acetate and sulphur are placed in the mixer, together with all the plasticizer. When the polymerized vinyl acetate and sulphur are melted and mixed with the plasticizer the balance of the ground polymerized vinyl acetate and sulphur is slowly added so that the mass in the mixer is at all times fairly fluid. When the complete charge is in the mixer the mass is fairly viscous and has a typical sulphur colour.

After about 20 minutes at 150° C. the mass in the mixer becomes less viscous, flows very smoothly and gradually loses the distinctive sulphur colour, the irridescent sulphur streaks change to irridescent spots. The mass stays at this consistency for about 25 minutes and then gradually thickens, becoming very smooth. When this stage is reached samples are withdrawn and tested for smoothness, smoothness meaning freedom from visible sulphur particles. Samples taken throughout the blending show a continual diminution in the size of the sulphur particle. In these samples the sulphur at first appears as large islands. When the blend is completed no sulphur is visible to the eye and the sample when chewed is very smooth to the tongue and is free from taste and odour.

It is very difficult to determine the chemical and physical nature of this blend. It is possible that some chemical combinations are formed, but I believe that the change is largely physical and that the base consists of a solution of colloidal sulphur in polymerized vinyl acetate. As near as I can determine, the plasticizer acts in this blend as a softener for the polymerized vinyl acetate.

The blend being completed, the mass is run into pans so as to make sheets about one-quarter inch thick. Blocks of any thickness can be cast, but the quarter inch sheets are very convenient to handle. The base is now ready to be worked into chewing gum with the desired flavors and sugars.

It is very necessary to keep the temperature during the blending operation between 150° C. and 170° C. reaching a temperature of 165° C.- 170° C. in the last 30 minutes. If the temperature is too high the polymerized vinyl acetate breaks down and various sulfides or sulfates are formed which make the product useless as a chewing gum base. If the temperature is too low the blending requires an extremely long time and the polymerized vinyl acetate breaks down due to prolonged heating in contact with the sulphur.

I have found that the blend must not be worked or agitated when it is between 90 and 60

115° C. If it is worked or agitated at this stage the sulphur particles coalesce and the blend becomes very rough and is useless as a chewing gum base.

After the base has cooled to about 60° C. it is ready to be made into chewing gum by the addition of sugars and flavoring.

The plasticity of chewing gum made from a chicle base can only be varied over a narrow range by blending chicle from various sources and various adulterants. The plasticity is also affected by the amount and kind of flavoring oil used. The straight sulphur gelva blend as described in my co-pending application Serial No. 653,923 is very hard and brittle. A plasticizer is used in making this blend for a chewing gum base. The amount of the plasticizer used is governed by the flavouring oils used in the finished chewing gum as flavouring oils have a varied softening effect on this base as on chicle. Spearmint oil will soften the base more than peppermint oil; therefore less plasticizer is used in the base which goes into spearmint chewing gum than in a base for peppermint chewing gum. This property of the base is very valuable as it allows the use of flavouring oils which soften chicle so much that these oils cannot be used with chicle.

Above I have given the proportions of polymerized vinyl acetate, sulphur and plasticizer which make a base suitable for a chewing gum carrying oils beneficial to the head passages. Such oils are menthol, eucalyptus and thyme. Below I give proportions for the finished gum:

| | Pounds |
|---|---|
| Base as above | 100 |
| Sugars | 260 |
| Flavouring oils | 6 |

Below I give proportions for a spearmint chewing gum:

| | Pounds |
|---|---|
| Polymerized vinyl acetate | 100 |
| Sulphur | 83 |
| Plasticizer | 24 |

Below I give proportions for the finished gum:

| | Pounds |
|---|---|
| Base as above | 100 |
| Sugars | 260 |
| Flavouring oil | 3 |

Below I give proportions for a peppermint chewing gum:

| | Pounds |
|---|---|
| Polymerized vinyl acetate | 100 |
| Sulphur | 83 |
| Plasticizer | 26 |

Below I give proportions for the finished gum:

| | Pounds |
|---|---|
| Base as above | 100 |
| Sugars | 260 |
| Flavouring oil | 3 |

The polymerized vinyl acetate sulphur, plasticizer blend has many advantages of decided value over chicle as a chewing gum base.

A manufacturer using chicle has to carry 9 to 14 months requirements in stock. This is not necessary if my base is used as the necessary materials can be purchased from stock.

Below I give some of the features in which a chewing gum made from the base described is superior to a chicle base gum:

(1) Retention of flavour. This is due to the property polymerized vinyl acetate has for retaining a solvent, the various flavouring oils being solvents of polymerized vinyl acetate.

(2) It does not stick to floors, clothes, furniture, etc, as chicle base gum does.

(3) It is a smooth and better chew.

(4) It has a much longer chewing life.

(5) It is made from materials which are pure and wholesome and do not depend on any purification treatment to achieve these properties.

(6) It has a lower cost as the polymerized vinyl acetate sulphur plasticizer base costs about one half of chicle.

I have found that the blend of polymerized vinyl acetate sulphur and a plasticizer blends or mixes with chicle and this mixture can be used as a base for chewing gum. The polymerized vinyl acetate sulphur plasticizer mixture blends in all proportions with chicle. By chicle, I refer not only to the gum from the Achras Sapota tree, but to Jelutong or any of the substitutes as mentioned in the first part of the specification, used for or with chicle.

The polymerized vinyl acetate, sulphur, and plasticizer blend gives a chewing gum of a light cream yellow colour. This colour can be changed by dyes to any desired shade; i. e. if it is considered desirable to make the base of the same colour as chicle it can be done by the addition of suitable dyes.

What I claim as my invention is:

1. A chewing gum base made from a blend of polymerized vinyl acetate, sulphur and plasticizer.

2. A chewing gum base containing a blend of polymerized vinyl acetate, sulphur and a plasticizer.

3. A chewing gum containing a base made from a blend of polymerized vinyl acetate, sulphur, plasticizer and chicle.

4. A chewing gum containing a blend of polymerized vinyl acetate, sulphur, plasticizer, sugars and a flavouring oil.

5. A chewing gum containing a base made from a blend of polymerized vinyl acetate, sulphur, plasticizer and chicle, together with sugars and flavouring oils.

6. The herein described method of manufacturing a chewing gum base which comprises blending a mixture of polymerized vinyl acetate, sulphur and a plasticizer at a temperature between 150° C. and 170° C. while subjecting the mixture to agitation, the temperature being raised during the mixture.

7. A chewing gum base made from a blend of substantially 50% polymerized vinyl acetate, substantially 40% sulphur and substantially 10% plasticizer.

GEORGE JAMES MANSON.